US008443594B2

(12) United States Patent
Prior et al.

(10) Patent No.: US 8,443,594 B2
(45) Date of Patent: May 21, 2013

(54) METHOD OF CONTROLLING TEMPERATURE OF A THERMOELECTRIC GENERATOR IN AN EXHAUST SYSTEM

(75) Inventors: Gregory P. Prior, Birmingham, MI (US); Michael G. Reynolds, Troy, MI (US); Joshua D. Cowgill, Harland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 551 days.

(21) Appl. No.: 12/753,344

(22) Filed: Apr. 2, 2010

(65) Prior Publication Data
US 2011/0240080 A1 Oct. 6, 2011

(51) Int. Cl.
*F01N 3/00* (2006.01)
*F01N 5/02* (2006.01)
*H01L 35/34* (2006.01)
*H01L 35/30* (2006.01)

(52) U.S. Cl.
USPC ............. 60/320; 60/287; 136/201; 136/205

(58) Field of Classification Search
USPC ................ 60/287, 288, 320; 136/201, 205
See application file for complete search history.

(56) References Cited

U.S. PATENT DOCUMENTS

| | | | |
|---|---|---|---|
| 5,625,245 A | 4/1997 | Bass | |
| 5,753,383 A | 5/1998 | Cargnelli et al. | |
| 7,051,522 B2 | 5/2006 | Yang et al. | |
| 7,100,369 B2* | 9/2006 | Yamaguchi et al. | 60/324 |
| 2011/0308560 A1* | 12/2011 | Arbuckle et al. | 136/205 |
| 2012/0060775 A1* | 3/2012 | Aixala | 123/2 |

* cited by examiner

*Primary Examiner* — Kenneth Bomberg
*Assistant Examiner* — Audrey K Bradley
(74) *Attorney, Agent, or Firm* — Quinn Law Group, PLLC

(57) ABSTRACT

A method of controlling the temperature of a thermoelectric generator (TEG) in an exhaust system of an engine is provided. The method includes determining the temperature of the heated side of the TEG, determining exhaust gas flow rate through the TEG, and determining the exhaust gas temperature through the TEG. A rate of change in temperature of the heated side of the TEG is predicted based on the determined temperature, the determined exhaust gas flow rate, and the determined exhaust gas temperature through the TEG. Using the predicted rate of change of temperature of the heated side, exhaust gas flow rate through the TEG is calculated that will result in a maximum temperature of the heated side of the TEG less than a predetermined critical temperature given the predicted rate of change in temperature of the heated side of the TEG. A corresponding apparatus is provided.

11 Claims, 3 Drawing Sheets

METHOD OF CONTROLLING TEMPERATURE OF A THERMOELECTRIC GENERATOR IN AN EXHAUST SYSTEM

STATEMENT REGARDING FEDERALLY SPONSORED RESEARCH OR DEVELOPMENT

This invention was made with government support under Department of Energy Agreement number DE-FC26-04NT42278. The government may have certain rights in the invention.

TECHNICAL FIELD

The invention relates to a method of controlling the temperature of a thermoelectric generator in an exhaust system of an engine.

BACKGROUND

Recovery of vehicle exhaust heat otherwise expelled from a vehicle can improve the efficiency of various vehicle systems and improve fuel economy. For example, vehicle exhaust heat has been used to warm engine coolant, especially after a cold start of the engine. Furthermore, a thermoelectric generator (TEG) can be integrated into a vehicle exhaust system to produce electrical energy from a temperature differential created by the exhaust heat and a coolant. Exhaust gas flow through the TEG must be controlled to prevent the TEG temperature from rising above a predetermined critical temperature. Control of the exhaust gas flow is typically based on a temperature sensor on the heated side of the TEG. Such temperature sensors experience a lag in indicating the actual heated side temperature as they do not change rapidly enough to reflect temperature changes due to the opening and closing of the bypass valve or changes in engine output. Accordingly, to prevent unintentionally exceeding the critical temperature, control systems for the exhaust gas flow must divert exhaust gas from the TEG at a temperature further below the critical temperature than would be necessary if a sensor without lag time issues were available. The temperature differential between the TEG and the coolant is thus decreased, and the electrical power output of the TEG is reduced.

SUMMARY

A method of controlling the temperature of a thermoelectric generator (TEG) in an exhaust system of an engine is provided. The TEG has a heated side and a cooled side and generates electrical power as a result of a temperature differential between the heated side and the cooled side. The method includes determining the temperature of the heated side of the TEG, determining the exhaust gas flow rate through the TEG, and determining the exhaust gas temperature, by sensors and/or modeling. A rate of change in temperature of the heated side of the TEG is then predicted based on the determined temperature of the heated side of the TEG, the determined exhaust gas flow rate to the TEG, and the determined exhaust gas temperature.

Using the predicted rate of change of temperature of the heated side, an exhaust gas flow rate through the TEG is calculated that will result in a maximum temperature of the heated side of the TEG less than a predetermined critical temperature. A position of a bypass valve corresponding with the calculated exhaust gas flow rate through the TEG is determined, and the bypass valve is actuated to the determined position to divert some of the exhaust gas away from the TEG, thereby reducing the predicted rate of rise of the heated side temperature, preventing the temperature of the heated side of the TEG from reaching the predetermined critical temperature. Thus, the method does not rely solely on the temperature indicated by the TEG temperature sensor to adjust the exhaust gas flow rate through the TEG, and the inherent problem of slow temperature sensor response time leading to premature exhaust gas flow diversion is avoided. Adjusting the exhaust flow through the TEG based on the predicted rate of rise allows the actual TEG heated side temperature to more closely approach the predetermined maximum heated side temperature, increasing the electrical output of the TEG in comparison to typical temperature sensor-based control systems.

Optionally, the method may also position the bypass valve to prevent the cooled side of the TEG from exceeding a predetermined maximum temperature, thereby preventing boiling of the liquid coolant, which is a concern especially during prolonged high load operation of the engine. For example, the method may include sensing coolant temperature, sensing engine speed, and calculating a flow rate of the coolant based on the engine speed. Temperature of the cooled side of the TEG is then calculated based on the sensed coolant temperature, the calculated flow rate of the coolant, and the sensed temperature of the heated side of the TEG. The calculated temperature of the cooled side of the TEG is compared with the predetermined maximum cooled side temperature, and the bypass valve is actuated to a position to limit further heating of the TEG if the calculated temperature of the cooled side of the TEG is greater than a predetermined maximum cooled side temperature.

An apparatus having the engine, the TEG, the sensors, and the bypass valve described above, as well as an electronic control unit configured with a stored algorithm that carries out the method described above is provided.

The above features and advantages and other features and advantages of the present invention are readily apparent from the following detailed description of the best modes for carrying out the invention when taken in connection with the accompanying drawings.

DETAILED DESCRIPTION

Figure 1:
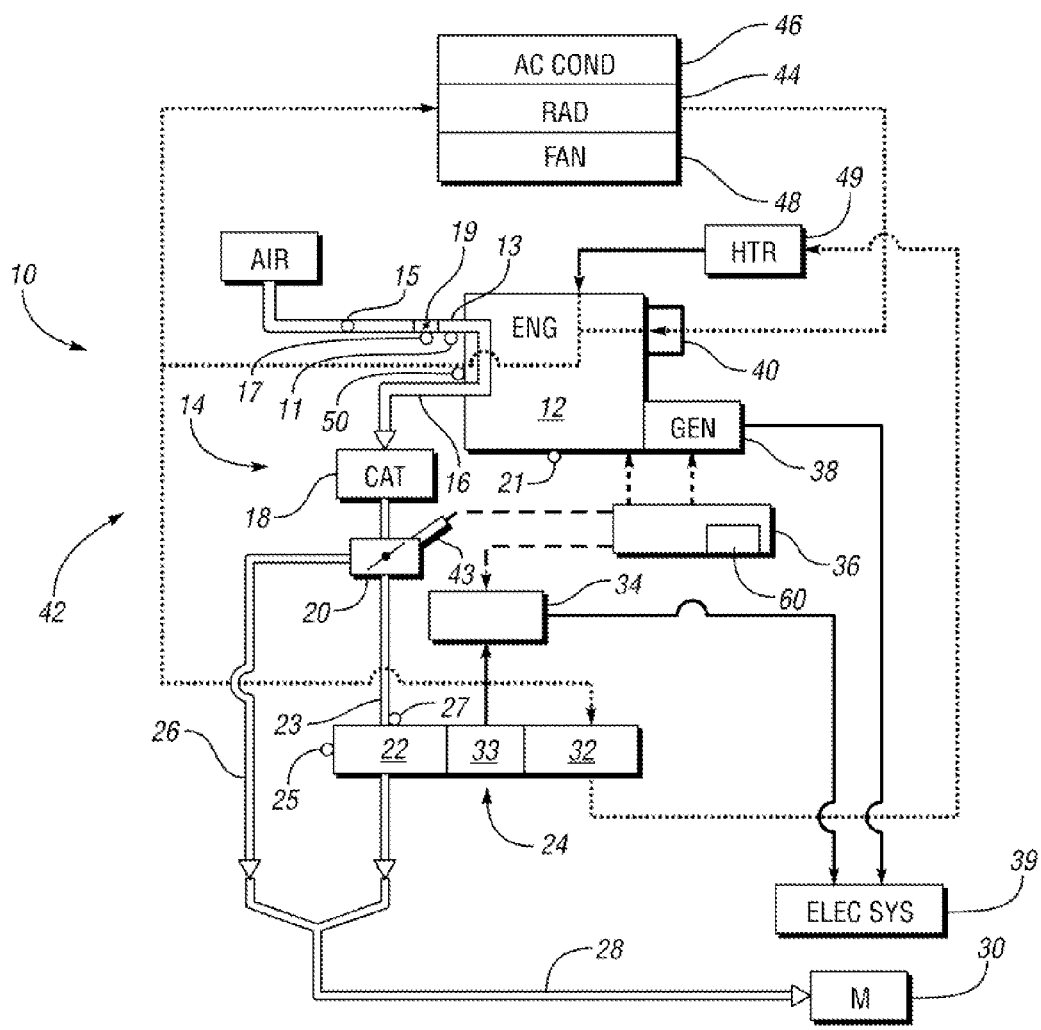
FIG. 1 is a schematic illustration of an apparatus with an engine, a thermoelectric generator (TEG) in an exhaust system, a radiator, and a cooling circuit.

Referring to the drawings, wherein like reference numbers refer to like components, FIG. 1 shows an apparatus 10 for a vehicle that includes an engine 12 (labeled ENG) with an exhaust system 14. The engine 12 has an air manifold 13 with a mass air flow (MAF) sensor 15. Alternatively or concurrently, a manifold air pressure (MAP) sensor 11 can be used to determine engine air flow. A throttle position sensor 17 is adjacent the throttle 19. An engine speed sensor 21 is operatively connected with a rotating portion of the engine 12, such as an engine crankshaft, and is configured to measure the revolutions per minute (rpm) of the engine or otherwise measure speed, as is known.

The exhaust system 14 includes an exhaust manifold 16 from which exhaust gas flows into a catalytic converter 18 (labeled CAT). The exhaust gas then flows through a bypass valve 20 that is positionable to allow exhaust gas flow through an exhaust passage 23 to a heated portion 22 (also referred to herein as a heated side or hot side 22) of a thermoelectric generator (TEG) 24 (discussed in further detail below), or to allow some or all of the exhaust gas to bypass the heated side 22 via a bypass passage 26. The operating conditions that determine the position to which the bypass valve 20 will be moved are discussed below. Exhaust gas flow through both the heated portion 22 and the bypass portion 26 is directed through an exhaust passage 28 to a muffler 30 (labeled M) to exit the apparatus 10. A TEG temperature sensor 25 is mounted to the heated side 22 to measure the heated side temperature. An exhaust gas temperature sensor 27 is mounted in the exhaust gas flow at the inlet of the heated side 22, or at another location in thermal communication with the exhaust gas flow.

The TEG also has a cooled portion 32 (also referred to herein as a cooled side or cold side 32) through which engine coolant is directed. Multiple thermoelectric modules 33 are subjected to a temperature differential between the heated side 22 and the cooled side 32, and are configured to generate electrical power in response to the temperature differential. The electrical power is stored in a battery 34. The battery 34 is operatively connected with an electronic control unit 36 that controls the engine 12 and can direct stored battery power to a generator 38 and/or other vehicle electrical systems 39. In this way, exhaust heat is used to generate power.

The engine coolant flows via an engine driven pump 40 (or, alternatively, by an auxiliary electrical pump) through a cooling circuit 42 denoted by dotted coolant passages that permit flow through the engine 12 to a radiator 44 (labeled RAD) that is also connected with an air conditioner condenser 46 (labeled AC COND) and a fan 48. Coolant can also flow from the engine 12 to the cooled side 32, and through a passenger compartment heater 49 before returning to the engine 12. A coolant temperature sensor 50 senses the temperature of the coolant.

The manifold air pressure sensor 11, the mass air flow sensor 15, the throttle position sensor 17, the engine speed sensor 21, the heated side temperature sensor 25, the exhaust gas temperature sensor 27, and the coolant temperature sensor 50 are all operatively connected to the electronic control unit 36. The electronic control unit 36 is configured with a stored algorithm 60 that controls temperature of the TEG 24 as discussed below.

The algorithm 60 is configured to control the position of the bypass valve 20 to prevent the temperature of the heated side 22 of the TEG 24 from exceeding a predetermined critical temperature above which damage to the TEG 24 can occur. The algorithm 60 uses multiple sensed inputs from the apparatus 10 to calculate an expected rate of rise of the temperature of the heated side 22, rather than relying on only the measured temperature of the heated side 22 (i.e., the temperature indicated by heated side temperature sensor 25). Typically, such heated side temperature sensors 25 lag in response time, which may cause the temperature of the heated side 22 to be above the predetermined maximum heated side temperature prior to adjusting the bypass valve 20. Accordingly, typical control systems for a TEG divert exhaust flow from the TEG when the sensed temperature of the heated side is significantly less than the predetermined maximum heated temperature. This required margin of safety due to the slow valve response time means that exhaust gas flow is diverted earlier than necessary, thus reducing electrical output of the TEG 24. The algorithm 60 improves upon such control systems by predicting the rate of rise of the heated side temperature 22, and adjusting the exhaust flow through the TEG 24 to allow the actual TEG heated side temperature to more closely approach the predetermined maximum heated side temperature. Optionally, the algorithm 60 is also configured to control the position of the bypass valve 20 to limit or prevent further heating of the TEG 24 if the temperature of the cooled side 32 of the TEG 24 exceeds a predetermined maximum cooled side temperature.

Figure 2:
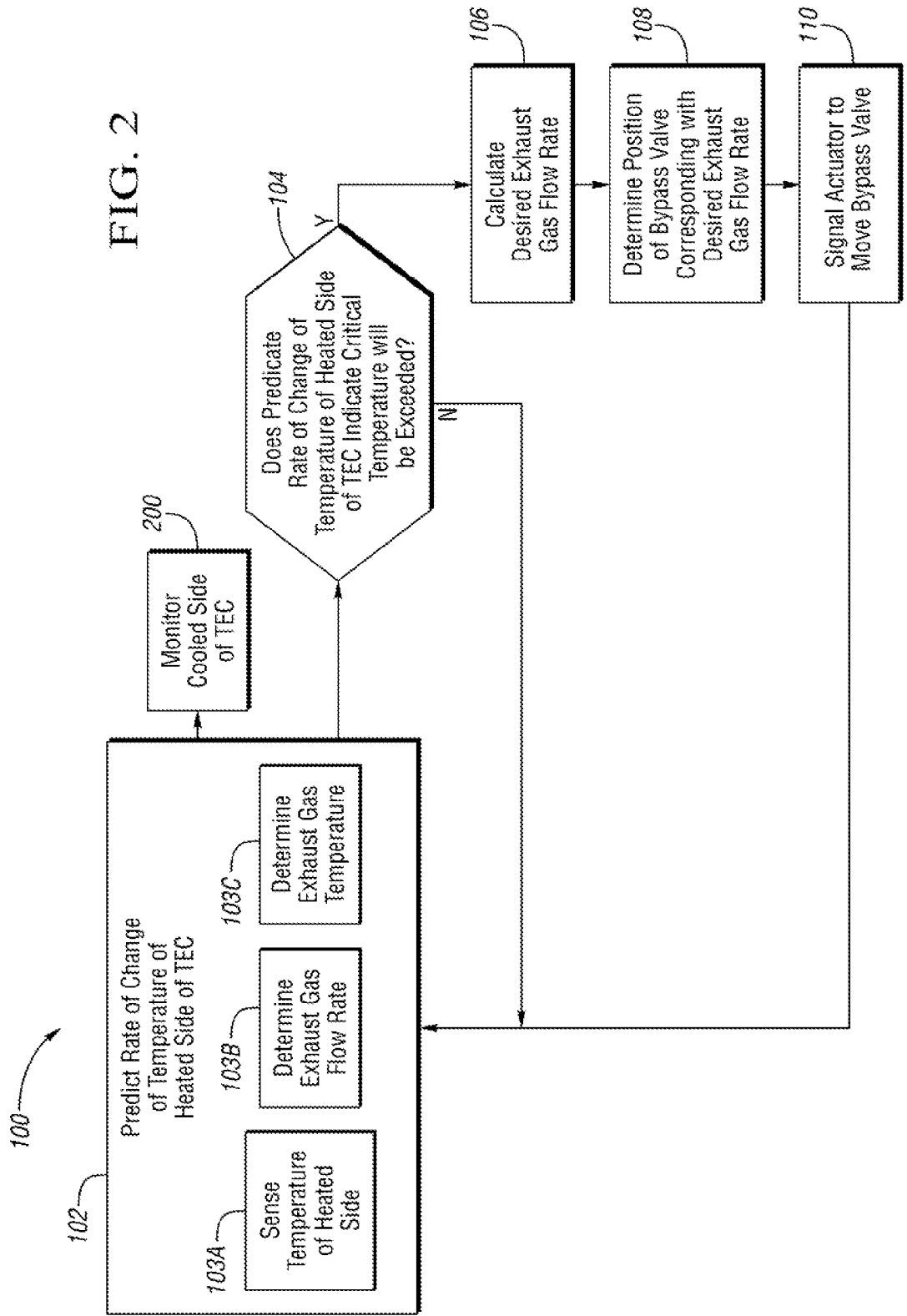
FIG. 2 is a schematic flowchart illustrating a method of controlling the temperature of the TEG of FIG. 1.

Referring to FIG. 2, a method 100 of controlling temperature of the TEG 24 that improves upon known methods is shown schematically. The method 100 begins with block 102 in which the rate of change of temperature of the heated side 22 of the TEG 24 is predicted. The predicted rate of change of temperature of block 102 is calculated based on determined (sensed and/or calculated based on models) operating conditions as set forth in blocks 103A, 103B and 103C. In block 103A, the temperature of the heated side 22 of the TEG 24 is sensed using the heated side temperature sensor 25, and the sensed information is sent to the electronic control unit 36. In block 103B, the exhaust gas flow rate through the TEG 24 is determined using sensed information from the mass air flow sensor 15. The mass air flow sensor 15 may be replaced or used in conjunction with a manifold air pressure sensor 11, in which case sensed engine speed from engine speed sensor 21 is also sent to the electronic control unit 36 so that the algorithm 60 can calculate an exhaust gas flow rate based on the sensed air pressure and engine speed based on mathematical relationships. In block 103C, the exhaust gas temperature is determined. The exhaust gas temperature may be determined by sensed information provided to the electronic control unit 36 by the exhaust gas temperature sensor 27. Alternatively, the exhaust gas temperature may be modeled (i.e., predicted) based on other sensed information such as the exhaust gas flow rate calculated from mass air flow (MAF) and fuel rate, the engine speed, load (manifold absolute pressure or MAP) and the coolant temperature sensor 50. The material properties of the exhaust gas, the TEG 24, including the thermoelectric modules 33, and the coolant may be used to determine the heat transfer into and flow through the TEG 24, which in turn may be used to determine the temperature at the thermoelectric modules 33 and the heat transferred into (and temperature of) the coolant. Thus, the predicted rate of rise in temperature of the heated side 22 does not rely on the heated side temperature sensor 25 alone, avoiding the aforementioned shortcoming presented by the response time lag of such temperature sensors.

After the rate of rise in temperature of the heated side 22 is calculated in block 102, the method continues in block 104, in which the algorithm 60 determines whether the predicted rate of rise in temperature of the heated side 22 is positive and of a magnitude that indicates the critical temperature of the TEG 24 will be exceeded if the position of the bypass valve 20 is not adjusted. This determination accounts for the cycling time of the method 100 (i.e., the time period between calculations in block 102) and the response time of the temperature of the heated side 22 of the TEG 20 to an adjustment in the position of the bypass valve 20. Such information can be gathered from test data stored in a look-up table in the electronic control unit 36.

If the algorithm 60 determines in block 104 that the predicted rate of rise in temperature of the heated side 22 will not cause the critical temperature to be exceeded, then the method 100 returns to block 102 to repeat the periodic calculations and predictions of rate of rise of temperature of the heated side 22, as described above.

However, if the algorithm 60 determines in block 104 that the predicted rate of rise in temperature of the heated side 22 will cause the critical temperature to be exceeded unless the bypass valve 20 is repositioned prior to the next subsequent periodic calculation and prediction of block 102, then the method 100 moves to block 106. In block 106, an exhaust gas flow rate through the TEG 24 is calculated that will result in a maximum temperature of the heated side 22 of the TEG 24 less than the critical temperature. The desired exhaust gas flow rate through the TEG 24 will be based on current operating conditions, as sensed or determined in blocks 102, 103A-103B, and 104. An exhaust gas flow rate can be based on such information and upon design specifications of the specific engine 12, exhaust system 14 and TEG 24. The closeness of the maximum allowed temperature of the heated side 22 to the critical temperature will depend on a predetermined margin in the algorithm 60 that will in any case be selected to allow the heated side temperature to more closely approach (without exceeding) the critical temperature than would a control system that adjusts the bypass valve 20 based only on information from the heated side temperature sensor 25.

After the desired exhaust gas flow rate through the TEG 24 is calculated in block 106, the method 100 moves to block 108 and determines a position of the bypass valve 20 that corresponds with the desired exhaust gas flow rate. That is, the position of the bypass valve 20 is chosen to divert some of the exhaust gas through the bypass passage 26, to reduce the flow rate through the TEG 24, ensuring that the critical temperature is not exceeded. The determination of the appropriate position of the bypass valve 20 can be made by the electronic control unit 36 referencing information in a look-up table that includes stored data from tests in which exhaust flow rates are measured for different positions of the bypass valve 20 under different operating conditions (engine speed, engine load, etc.).

Once the desired position of the bypass valve 20 is determined in block 108, the method moves to block 110. In block 110, the electronic control unit 36 sends a control signal to a bypass valve actuator 43, such as a solenoid. The bypass valve actuator 43 moves the bypass valve 20 to the desired position corresponding with the control signal to achieve the exhaust flow rate through the TEG 24 as calculated in block 106. With the bypass valve 20 now positioned to prevent the TEG 24 from exceeding a predetermined critical temperature, the method 100 returns to block 102 to continue to periodically sense current operating conditions and predict a rate of rise of the temperature of the TEG heated side 22 based on the changing conditions.

Figure 3:
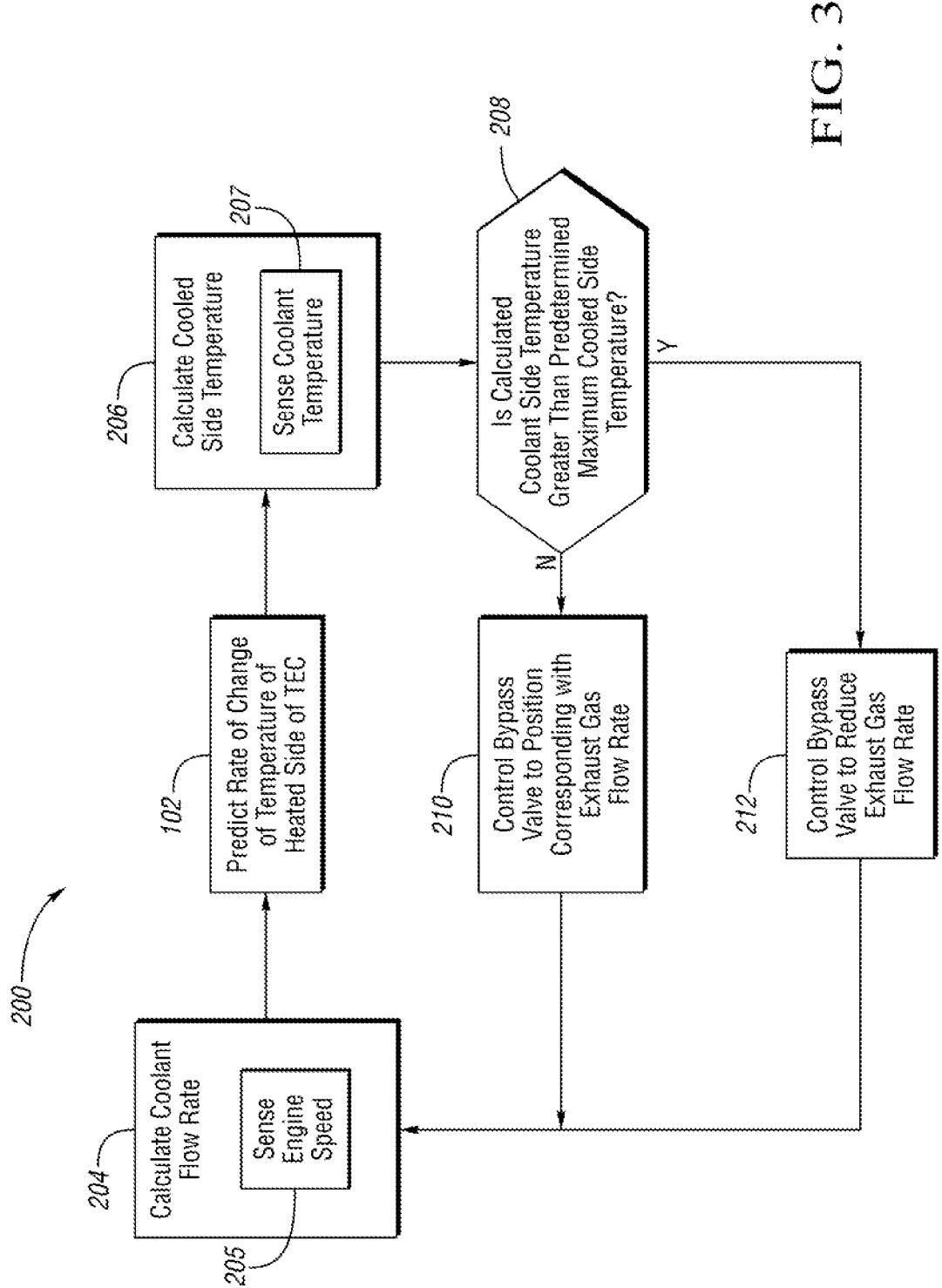
FIG. 3 is a schematic flowchart illustrating a further portion of the method of FIG. 2.

Referring to FIG. 3, an optional additional portion 200 of the method 100 may be carried out to also monitor the cooled side 32 of the TEG 24 and to further adjust the exhaust gas flow rate through the TEG 24 to ensure that the cooled side 32 does not exceed a predetermined maximum cooled side temperature, thus maintaining an adequate temperature differential between the heated side 22 and the cooled side 32 to produce sufficient electrical power.

Specifically, the additional portion 200 of method 100 begins with block 204 in which the coolant flow rate is calculated. The calculation of coolant flow rate in block 204 requires sensing of the engine speed in block 205. The engine speed is sensed by engine speed sensor 21 of FIG. 1. The coolant flow rate calculated in block 204 is based on the sensed engine speed according to a mathematical relationship between coolant flow rate and engine speed stored in the algorithm 60. The mathematical relationship may be derived from testing in which coolant flow rates are measured for various different engine speeds. Coolant flow rate is related to engine speed because the engine pump 40 used to pump the coolant is powered by the engine 12 and runs at a speed proportional to the engine speed.

Next, the predicted rate of rise of the temperature of the heated side 22, as calculated in block 102 is considered and, using the calculated coolant flow rate and calculated rate of rise of heated side temperature, a cooled side temperature is calculated in block 206. The calculated cooled side temperature is also based on coolant temperature sensed in block 207 using coolant temperature sensor 50. The calculated coolant side temperature is compared to a predetermined maximum cooled side temperature in block 208. If the calculated coolant side temperature is less than the predetermined maximum cooled side temperature, then the bypass valve 20 may be controlled in block 210 to permit exhaust flow through the TEG 24, according to the position determined in block 108 of FIG. 2. However, if the calculated cooled side temperature is greater than the predetermined maximum cooled side temperature, then the position of the bypass valve 20 is adjusted in block 212 to reduce exhaust gas flow through the TEG 24 (i.e., to divert more exhaust gas than indicated by the bypass valve position determined in block 108 based on the predicted rate of rise of the heated side of the TEG 24, and possibly to completely close the bypass valve 20 if necessary to achieve a reduction in cooled side temperature below the predetermined maximum cooled side temperature). After adjusting the position of the bypass valve 20 according to either block 210 or 212, the portion 200 of method 100 returns to block 204 to calculate coolant flow rate as a function of engine speed and periodically monitor the cooled side temperature by repeating the remaining blocks of FIG. 3 as described above.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
an engine;
an exhaust system operatively connected to the engine and configured to remove exhaust gas from the engine;
a thermoelectric generator (TEG) operatively connected to the exhaust system and configured to allow exhaust gas flow therethrough;
a bypass valve selectively movable to direct at least a portion of the exhaust gas away from the TEG under predetermined operating conditions;
a plurality of sensors each operatively connected to one of the engine, the exhaust system, and the TEG; and
an electronic control unit operatively connected to the sensors and the bypass valve and having a stored algorithm configured to predict a rate of change in temperature of the TEG based at least partially on information received from the sensors and to move the bypass valve in accordance with the predicted rate of change in temperature of the TEG to prevent temperature of the TEG from exceeding a predetermined maximum temperature.

2. A method of controlling temperature of a thermoelectric generator (TEG) in an exhaust system of an engine, wherein the TEG has a heated side and a cooled side and generates electrical power as a result of a temperature differential between the heated side and the cooled side, wherein the exhaust system has a bypass passage and a bypass valve positionable to control the exhaust gas flow through the TEG by diverting at least some of the exhaust gas through the bypass passage, the method comprising:

determining temperature of the heated side of the TEG;
determining exhaust gas flow rate through the TEG;
determining exhaust gas temperature of exhaust gas flowing through the TEG;
predicting a rate of change in temperature of the heated side of the TEG based on the determined temperature of the heated side of the TEG, the determined exhaust gas flow rate through the TEG, and the determined exhaust gas temperature;
calculating an exhaust gas flow rate through the TEG that will result in a maximum temperature of the heated side of the TEG less than a predetermined critical temperature given the predicted rate of change in temperature of the heated side of the TEG;
determining a position of the bypass valve corresponding with the calculated exhaust gas flow rate through the TEG; and
actuating the bypass valve to the determined position, thereby preventing the temperature of the heated side of the TEG from reaching the predetermined critical temperature.

3. The method of claim 2, wherein the determining the exhaust gas flow rate includes using sensed information from a mass air flow sensor.

4. The method of claim 2, wherein the determining the exhaust gas flow rate includes using sensed information from a manifold absolute pressure sensor and an engine speed sensor.

5. The method of claim 2, wherein the determining exhaust gas flow rate includes using sensed information from a mass air flow sensor, a manifold air pressure sensor, and an engine speed sensor.

6. The method of claim 2, wherein the cooled side of the TEG is cooled with coolant pumped by a pump and flowing through the TEG, wherein the pump is powered by the engine, and further comprising:
sensing coolant temperature;
sensing engine speed;
calculating a flow rate of the coolant based on the engine speed; and
calculating a temperature of the cooled side of the TEG based on the sensed coolant temperature, the calculated flow rate of the coolant, and the sensed temperature of the heated side of the TEG.

7. The method of claim 6, wherein the exhaust system has a bypass passage and a bypass valve positionable to control the exhaust gas flow through the TEG by diverting at least some of the exhaust gas through the bypass passage, and further comprising:
comparing the calculated temperature of the cooled side of the TEG with a predetermined maximum cooled side temperature; and
actuating the bypass valve to a position to limit further heating of the TEG if the calculated temperature of the cooled side of the TEG is greater than the predetermined maximum cooled side temperature.

8. A method of controlling temperature of a thermoelectric generator (TEG) in an exhaust system of an engine, wherein the TEG has a heated side heated by exhaust gas flow and a cooled side cooled by coolant flow and generates electrical power as a result of a temperature differential between the heated side and the cooled side, the method comprising:
determining temperature of the heated side of the TEG;
determining exhaust gas flow rate through the TEG;
determining exhaust gas temperature through the TEG; and
predicting a rate of change in temperature of the heated side of the TEG based on the determined temperature of the heated side of the TEG, the determined exhaust gas flow rate through the TEG, and the determined exhaust gas temperature through the TEG;
sensing coolant temperature;
sensing engine speed;
calculating a flow rate of the coolant based on the engine speed;
calculating a temperature of the cooled side of the TEG based on the sensed coolant temperature, the calculated flow rate of the coolant, and the determined temperature of the heated side of the TEG; and
controlling the exhaust gas flow through the TEG by positioning a bypass valve to divert at least some of the exhaust gas flow away from the TEG based on the predicted rate of change in temperature of the heated side and the calculated temperature of the cooled side, thereby preventing a heated side temperature greater than a predetermined maximum heated side temperature and limiting further heating of the TEG if the cooled side temperature is greater than a predetermined maximum cooled side temperature.

9. The method of claim 8, wherein the determining the exhaust gas flow rate includes using sensed information from a mass air flow sensor.

10. The method of claim 8, wherein the determining the exhaust gas flow rate includes using sensed information from a manifold absolute pressure sensor and an engine speed sensor.

11. The method of claim 8, wherein the determining the exhaust gas flow rate includes using sensed information from a mass air flow sensor, a manifold absolute pressure sensor and an engine speed sensor.

* * * * *